Sept. 27, 1966     R. P. SMITH     3,275,370
MOTOR VEHICLE
Filed May 18, 1964     5 Sheets-Sheet 4
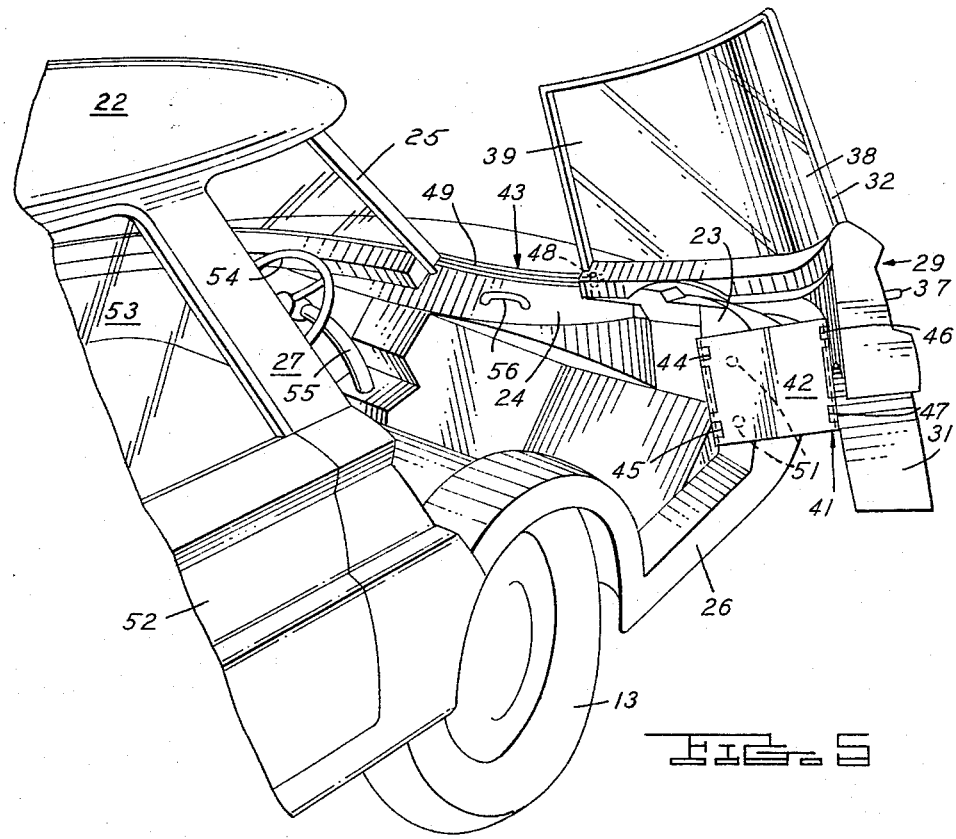
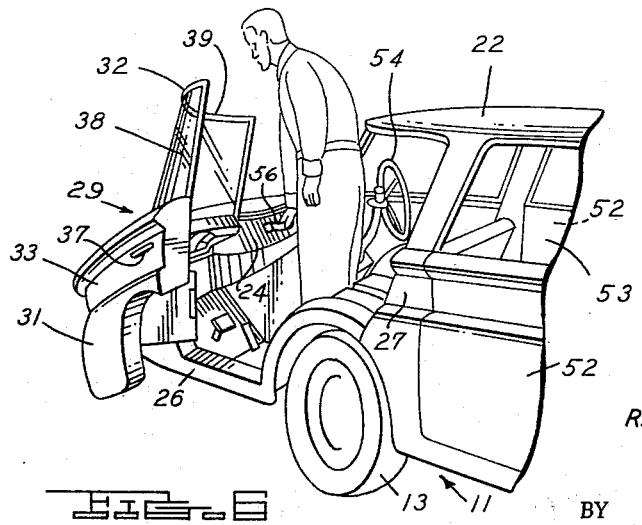
RAYMOND P. SMITH
INVENTOR.
BY J. R. Faulkner
J. G. Beck
ATTORNEYS Sept. 27, 1966   R. P. SMITH   3,275,370
MOTOR VEHICLE Filed May 18, 1964   5 Sheets-Sheet 5

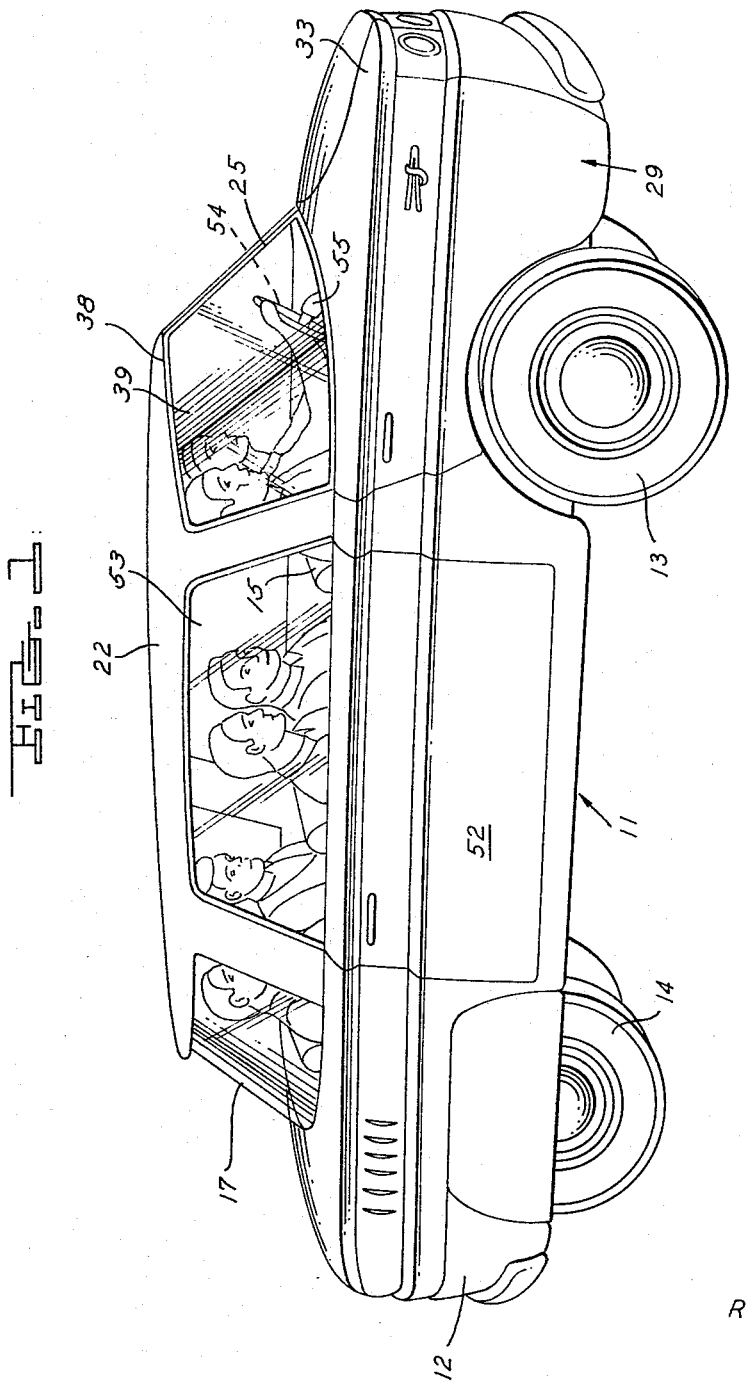

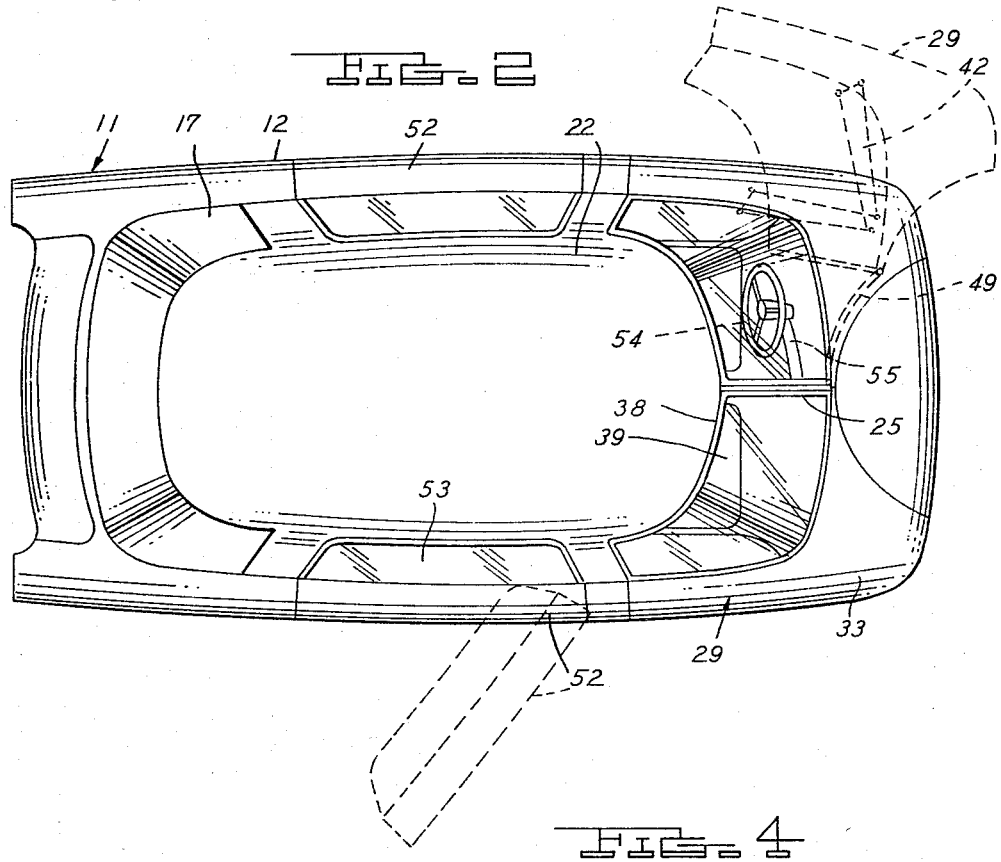
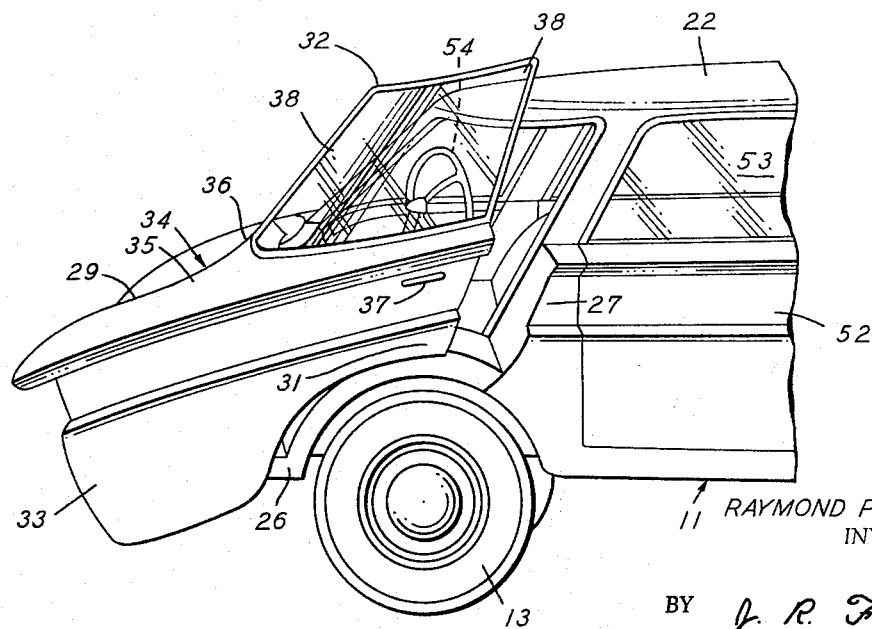

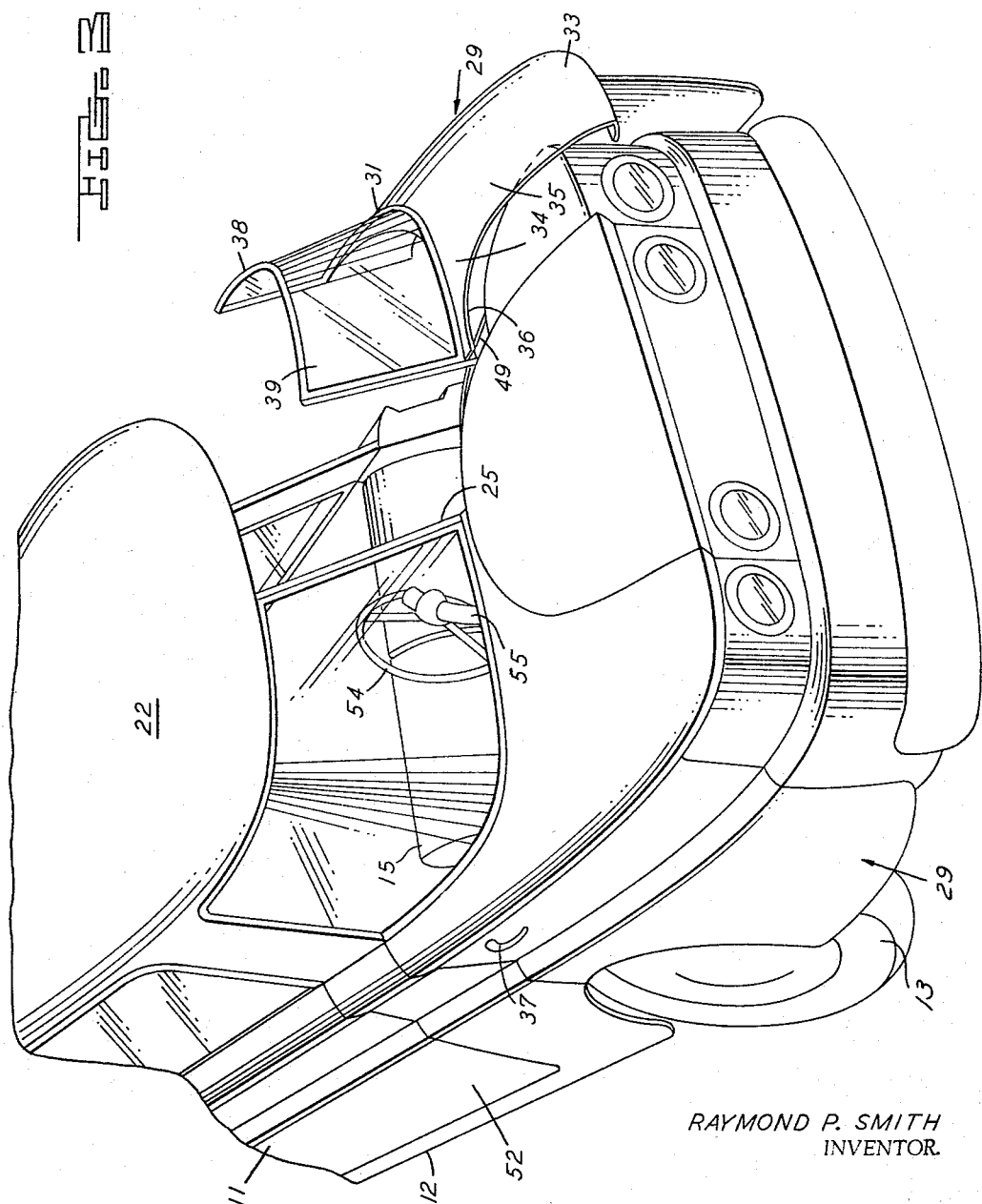

RAYMOND P. SMITH
INVENTOR.

BY
J. R. Faulkner
J. D. Beck
ATTORNEYS

United States Patent Office 3,275,370
Patented Sept. 27, 1966

3,275,370
MOTOR VEHICLE
Raymond P. Smith, Huntington Woods, Mich., assignor to Ford Motor Company, Dearborn, Mich., a corporation of Delaware
Filed May 18, 1964, Ser. No. 368,296
3 Claims. (Cl. 296—63)

This invention relates generally to an improvement in motor vehicles and more particularly to a "compact" automotive vehicle of the sedan type having substantially increased seating and load capacity.

Current passenger vehicles of the compact type have relatively light and stubby body structures to obtain such advantages as maneuverability and economy of operation. As a result, these vehicles have also limited passenger and storage space. The openings to such vehicles are consequently limited in size and thus require stooping by the passengers and the driver of the vehicle in seeking egress from or ingress to the passenger compartment. Further, limited size body openings present difficulty in the loading and unloading of such vehicles and, therefore, they cannot be effectively utilized as load carriers. These inherent limitations of compact vehicles have reduced their sales appeal to the economy-minded motoring public, especially to one-car families who require maximum flexibility of their family car.

Several vehicle manufacturers are now marketing compact vehicles which have been designed to overcome these shortcomings. In such vehicles the roof line has been substantially raised, the engine has been mounted under the vehicle floor, and large loading doors have been provided. These design changes have made such compact vehicles look more like a bus or commercial vehicle than a passenger sedan. Due to the awkardness of such a design and its styling limitations, these vehicles have not been fully accepted by the public, although for special limited applications such vehicles have proven useful.

Accordingly, the prime purpose of this invention is to provide an improved, novel compact vehicle of aesthetic design proportions that provides ample seating and load capacity. The front and rear seats of the vehicle of this invention are ararnged so that at least six passengers can be comfortably accommodated. The seat backs of the two rows of rear seats are designed to be folded downwardly to provide a low deck to permit the use of the vehicle of this invention as a load carrier.

Further, the vehicle of this invention has improved, novel closure structures for the front and rear body openings to the vehicle body to provide ease of access for passengers or the driver and to improve the loading and unloading of the vehicle.

The front closure structure for the vehicle embodying this invention provides access to the front seats and comprises a lower door structure and an upper panel that includes a portion of the wraparound windshield of the vehicle and the front side window. The lower door structure includes a front fender, a portion of the cowl structure, and a portion of the hood. This closure structure is pivotally supported from the vehicle body by a control arm disposed between the lower door structure and the door pillar and by a guide mechanism interposed between the wraparound windshield and the vehicle body. The control arm and the guide mechanism are constructed and arranged to guide the closure structure during its initial opening movement laterally outwardly and forwardly with respect to the front opening. A forward, tilting motion is also imparted to the closure structure. During further opening movement of the front closure structure, it is displaced in an angularly outward direction while being tilted further in a forward direction so that the entire lower door structure and upper panel will clear the body opening to facilitate entry into the vehicle.

The closure structure for the rear body opening of the vehicle embodying this invention provides access to the rear two rows of seats in the vehicle body. Each rear door closure structure has one edge hingedly attached to the vehicle body in a conventional manner that permits the rear closure structure to clear the entire rear body opening when manually swung to an opened position.

Therefore, a further object of this invention is to provide a compact vehicle that has ample passenger seating capacity and may also be used as a load carrier when the seat backs of the rear seats are folded down.

A still further object of this invention is to provide a front closure structure that permits access to and from the front seats of the vehicle without requiring the front passenger or driver to stoop down during entry to or egress from the vehicle.

Other objects and advantages of this invention will be made more apparent as this description proceeds, particularly when considered in connection with the accompanying drawings wherein:

FIGURE 1 is a side perspective view of a vehicle embodying this invention;

FIGURE 2 is a plan view of the vehicle shown in FIGURE 1;

FIGURE 4 is a side perspective view of the front portion of the vehicle with one front closure structure in a nearly fully opened position;

FIGURE 5 is a fragmentary perspective view of the vehicle, looking partially into the passenger compartment through the front body opening, with the front closure structure therefor shown in its fully opened position;

FIGURE 6 is a fragmentary perspective view of the front portion of the vehicle with the front closure structure shown in a fully opened position to illustrate the ease of egress from the driver's seat;

FIGURE 9 is a fragmentary side perspective view of the vehicle with its rear closure structure shown in its extreme opened position and with the seat backs of the two rows of rear seats shown in a folded down position.

Figure 3:
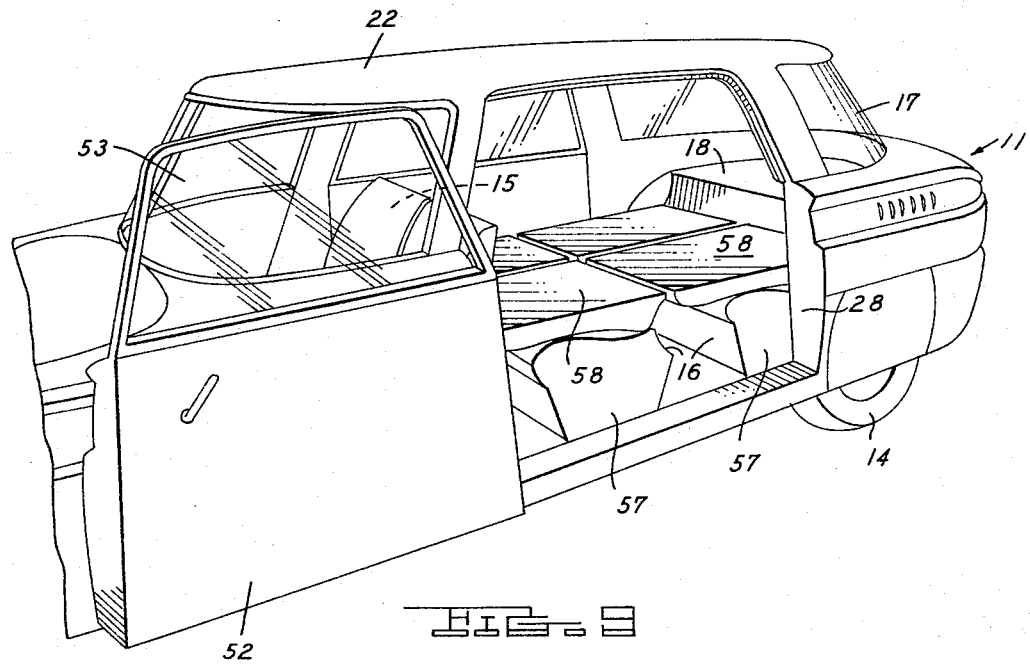
FIGURE 3 is a fragmentary perspective view of the front portion of the vehicle of this invention with one front closure structure being shown in a partially opened position and the other front closure structure shown in a closed position.

Referring now to FIGURE 1, there is shown a side perspective view of a four-door, sedan-type vehicle, generally designated 11, embodying the present invention. The vehicle 11 has a relatively short wheel base similar to present-day vehicles commonly referred to as "compacts." The vehicle 11 has a vehicle body 12 that is conventionally mounted on a pair of front road wheels 13 and a pair of rear road wheels 14. The overhang of the vehicle body 12 forwardly and rearwardly of the road wheels 13 and 14 is relatively short with the main portion of the vehicle body 12 being centrally disposed between the wheels. A front row 15 and two rear rows 16 of passenger seats are provided inside the vehicle body with each row capable of comfortably seating two adults. The vehicle body 12 has a wraparound rear backlite 17 to provide maximum rear view visibility for the occupants.

The vehicle 11, in this instance, is a rear drive vehicle with the engine (not shown) mounted transversely behind the last row 16 of seats and connected by propeller shafts to the rear road wheels 14. The engine is enclosed by a cover 18 (best seen in FIGURE 9) to provide access for service requirements. The vehicle body 12 has a front body opening 19 on each side at the front and a rear body opening 21 on each side substantially centrally disposed thereof.

The front body opening 19 is defined at the top by a roof panel 22; at the front by a front door pillar 23, a cowl structure 24, and a center windshield post 25 extending upwardly from the cowl structure 24; at the bottom by a longitudinal portion of a sill member 26 which is arcuate in part to provide clearance for the front road wheels 13; and at the rear by a vertical body structural member 27 that serves as a front door jamb and rear door pillar.

The rear body opening 21 on each side of the vehicle body 12 is defined at the top by the roof panel 22; at the front by the vertical body structural member 27; at the rear by a vertically disposed door jamb member 28; and at the bottom by a portion of the sill member 26.

A front closure 29 is pivotally mounted from the vehicle body 12 to enclose the front body opening 19. The front closure structure 29 includes a lower door structure 31 and an upper panel 32 extending upwardly therefrom. The lower door structure 31 extends forwardly incorporating the entire front fender panel 33. An arcuate sheet metal extension 34 extends laterally inwardly from the top portion of the front fender panel 33 and terminates at the center windshield pillar post 25. This arcuate sheet metal extension 34 includes a hood portion 35 and an outer cowl extension 36. A conventional door handle 37 is fastened to the outside of the lower door structure 31.

The upper panel 32 is fabricated from a continuous glass sheet that includes a front side window portion 38 and a portion of the wraparound windshield 39 of the vehicle 11. The top segment of the upper panel 32 is designed to curve inwardly into the roof panel 22.

The front closure structure 29 is supported from the vehicle body and guided with respect thereto by a control means generally designated as 41 and comprising a rectangular-shaped control arm 42 and a guide mechanism 43.

Figures 7, 8:
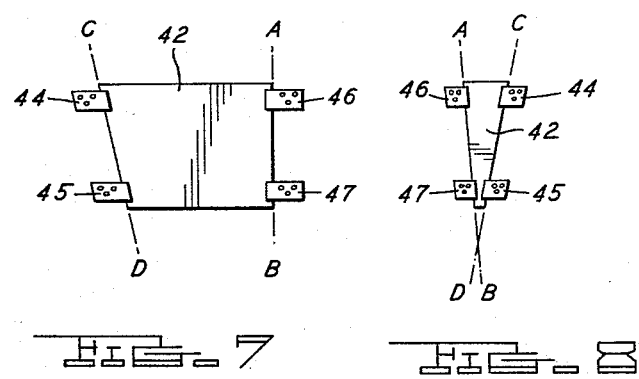
FIGURES 7 and 8 are diagrammatic views illustrating the hinge geometry of the front closure structure relative to the vehicle body.

The control arm 42, as best seen in FIGURES 2, 5, 7 and 8, has a pair of vertically spaced hinges 44 and 45 to connect one edge of the control arm 42 to the front door pillar 23 and a second pair of vertically spaced hinges 46 and 47 to connect the other edge of the control arm 42 to the inside surface of the lower door structure 31 inwardly from its rearward edge. The control arm 42 is offset in two directions. When the front closure structure 29 is in a closed position and the control arm 42 is viewed in side elevation from the inside of the vehicle 11, the first pair of hinges 44 and 45 lie on a generally vertically disposed axis CD, and the second pair of hinges 46 and 47 lie on a generally vertically disposed axis AB as best seen in FIGURE 7. Both axes AB and CD make a slight angle with the vertical line and are slightly canted with respect to each other. When the front closure structure 29 is in a closed position and the control arm 42 is viewed from the rear as seen in FIGURE 8, it can be seen that the substantially vertically extending axes AB and CD are also slightly canted towards each other. The purpose of the triangulation of the double pivoted control arm 42 will be hereinafter described.

The guide mechanism 43 includes a follower 48 attached to the lower inward corner of the outer cowl extension 36 of the lower door structure 31 as best seen in FIGURE 5. This follower 48 is received in a guide rail 49 that is mounted on the cowl structure 24 of the vehicle body 12. The guide rail 49 extends from the base of the windshield center post 25 in an outward and forward direction with a slight dip in its center portion. The follower 48 is received within this guide rail 49 and coacts with the pivotal movement of the control arm 42 to control the path of the front closure structure 29 during its opening and closing movement. A stop 51 is attached to the front door pillar 23 as best seen in FIGURE 5. This stop 51 is abutted by the control arm 42 when the front closure structure 29 has reached its maximum opened position as seen in FIGURE 6.

The front closure structure 29 can be manually opened by either having an outward pull applied to the door handle 37 by a person seeking ingress to the vehicle 11 or by pushing outwardly on the inside surface of the lower door structure 31 by a person seeking egress from the vehicle 11. During initial opening movement, the front closure structure 29 moves laterally outwardly and slightly forwardly in a plane substantially coincident with the plane on the side of the vehicle body 12. During this initial opening movement, the double pivoted control arm 42 will swing angularly outwardly from the vehicle body 12 to place the lower door structure 31 in a laterally outward and forward direction. The follower 48 in the guide rail 49 will retain the front closure structure 29 in a plane substantially parallel with the plane of the side of the vehicle body 12.

As the axes AB and CD extending through the vertically disposed hinges 44 and 45 and 46 and 47, respectively, are slightly canted, the front closure structure 29 will be slightly raised and also tilted very slightly in a forward direction, as best seen in FIGURE 3, during its initial phase of opening movement. Upon continuous opening movement of the front closure structure 29, the lower door structure 31 will be angularly displaced with respect to the plane of the side of the vehicle body and have its forward portion dip in an angular, forward direction until the control arm 42 abuts the stop 51 as best seen in FIGURE 5 and FIGURE 6. The specific path followed during opening movement is governed by the triangulation of the hinges 44, 45, 46 and 47 and the arcuate configuration of the guide rail 49.

As can be readily seen in FIGURES 5 and 6, the windshield portion 39 is translated in a forward and outward direction during the opening movement of the lower door structure 31 to provide unobstructed access to the front seat in the front row 15.

A rear closure structure 52 is provided for each rear door opening 21 to provide access to the two rear rows of seats 16. The rear closure structure 52 is conventionally hinged to the vehicle body 12 and can be swung from a closed position to an opened position in an arc of 180° as shown in FIGURE 9 to provide maximum accessibility to the two rear rows of seats 16. The rear closure structure 52 includes an upper window portion 53 that curves into the roof panel 22 as best seen in FIGURE 2.

The vehicle 11 has a steering wheel 54 that is attached to a centrally mounted steering column 55 as seen in FIGURE 5. The upper portion of the steering column 55 extends in a lateral direction so that the steering wheel 54 is positioned in front of the driver during normal operation of the vehicle 11. The steering column 55 is designed to swing away so that the steering wheel 54 will move from its position in front of the driver towards the center of the vehicle as best sen in FIGURE 6. A handle 56 is mounted below the guide rail 49 and attached to the cowl structure 24 in front of each front seat in the front row 15 so as to facilitate egress from the vehicle body 12 for the driver or passenger sitting in the front row 15.

The two rear rows of seats 16 have cushioned seat portions provided with upwardly extending seat backs 58. The seat backs 58 are pivotally connected to the seat portions 57 to permit them to be swung forwardly as best seen in FIGURE 9. The back surface of the seat backs 58 are formed from a relatively hard, flat material.

The rear rows of seats 16 are arranged so that, when the seat backs 58 are folded down, a continuous flat load-surface behind the front row 15 is effected. This loading surface will permit carrying a relatively large volume of luggage in the vehicle 11 or even mattresses may be placed on this loading surface to provide for sleeping accommodations. For commercial purposes, packages or other miscellaneous bulk material may be carried on this loading surface. Additional storage space is provided above the cover 18 placed on the engine.

If the vehicle 11 is to be utilized only as a parcel delivery truck, the last two rows of seats 16 may be removed to afford ample loading space that is readily accessible from either rear body opening 21.

It can be readily seen that the vehicle 11 of this invention has a large variety of applications. It can also be seen that the driver or front passenger can readily enter or leave the vehicle without stooping as seen in FIGURE 6. The driver seated in the vehicle 11 may readily swing the steering wheel 54 from in front of him towards the center of the vehicle 11 and pull himself into an upright position by grasping the handle 56. Also, when the front closure structure 29 is in a fully opened position, the driver can enter the vehicle in a standing position without stooping. When the driver sits down and the front closure structure 29 is pulled into a closed position, the driver is actually sitting ahead of the main portion of the vehicle body 12 to give the effect as though he were sitting in a cockpit.

The large rear body opening 21 and the associated rear closure structure 52 provide easy access to the rear portion of the vehicle body 12. As readily understood from the description, the vehicle 11 can be converted to a load carrier or a camper if desired as the rear rows of seats 16 can be converted to provide a loading surface. When the seat backs 58 are in an upright position, at least six adult persons may be comfortably seated in the vehicle 11.

It will be understood that the invention is not to be limited to the exact construction shown and described but that various changes and modifications may be made without departing from the spirit and scope of the invention as defined in the appended claims.

I claim:

1. In a motor vehicle comprising a vehicle body mounted on a vehicle chassis having front and rear wheels defining a short wheel base, at least one row of front seats located proximate to said front wheels and two rows of rear seats, said two rows of rear seats having seat backs foldable from an upright position to a horizontal position, said seat backs when in a horizontal position providing a low deck loading area rearwardly of said one row of front seats, a first body opening located in its entirety above and forward of said front wheels for access to said one row of front seats, said first body opening defined at least in part by a generally vertically extending front door pillar, a generally vertically extending windshield post at the longitudinal center axis of said vehicle, and a generally transversely extending inner cowl member, a second body opening for access to the two rows of rear seats, said second body opening being on one side of said vehicle body and defined at least in part by a vertically extending rear door pillar and a vertically extending door jamb member, a first closure structure for said first body opening mounted on said vehicle body forward of said front wheels for movement between closed and opened positions, said first closure structure comprising a lower door structure with a front fender panel extending longitudinally thereof, a laterally extending hood portion and outer cowl forming extension affixed to the upper edge of said lower door structure and extending laterally inwardly thereof, and an upper glass panel including a generally longitudinally extending side window integrally formed with one-half of a generally transversely extending windshield extending upwardly from said outer cowl forming extension, a control arm for said first closure structure having one end pivotally connected to said front door pillar and having its other end pivotally connected to said lower door structure intermediate its vertical edges, follower means attached to the generally transversely inwardly extending end of said outer cowl forming extension, and an arcuate guide rail slidably receiving said follower means, said guide rail extending generally transversely outwardly and forwardly from said windshield post and supported by said inner cowl member, said control arm and said guide rail coacting to control the movement of said first closure structure from its closed position to an intermediate opened position laterally outwardly, forwardly and slightly tiltable forwardly with respect to said first body opening, said first closure structure then being angularly displaced with respect to said body opening and further tilted forwardly during further opening movement of said first closure structure from said intermediate opened position to its maximum opened position, and a second closure structure pivotally mounted on said rear door pillar for swinging movement about a vertically extending axis coincident with one edge of said rear door pillar to provide access to said two rows of rear seats.

2. In a motor vehicle comprising a vehicle body mounted on a vehicle chassis having front and rear wheels, a front seat located substantially above said front wheels, said front seat being accessible by means of an opening in said vehicle body located in its entirety above and forward of said front wheels, a closure structure for said opening movable from a closed position to an open position, said closure structure comprising a lower door structure and a panel extending upwardly therefrom, said lower door structure including a front fender, said panel including a windshield forming portion, control means interposed between said lower door structure and said vehicle body, and guide means interposed between said windshield forming portion and said vehicle body, said control means and said guide means coacting with said closure structure to control movement of the latter from a closed position to an intermediate opened position laterally outwardly, forwardly, and tilted forwardly with respect to said body opening, said closure structure then being angularly displaced with respect to said body opening and tilted further downwardly during further movement of said closure structure from an intermediate opened position to its maximum opened position.

3. In a motor vehicle comprising a vehicle body mounted on a vehicle chassis having a short wheel base, at least one front row of seats in the front portion of said vehicle body; a body opening for access to said front row of seats defined at least in part by a generally vertically extending front door pillar, a generally vertically extending windshield post and a generally transversely extending inner cowl member; a closure structure for said body opening mounted on said vertically extending front door pillar for movement between closed and opened positions; said closure structure comprising a lower door structure having a longitudinally extending front fender integrally formed therewith, a laterally extending hood portion and a laterally extending outer cowl forming extension affixed to the upper edge of said lower door structure, and an upper glass panel including a generally longitudinally extending side window integrally formed with a generally transversely extending windshield portion extending upwardly from said outer cowl forming extension; a hinge assembly including a first pair of vertically spaced hinges having a common first pivotal axis and pivotally connecting one end of said hinge assembly to said front door pillar, a second pair of vertically spaced hinges having a common second pivotal axis and pivotally connecting the other end of said hinge assembly to said lower door structure, said first pivotal axis and said second pivotal axis being vertically inwardly canted with respect to each other when viewed from the side of the vehicle and from the rear of the vehicle when said closure structure is in the closed position; follower means attached to the generally transversely inwardly extending end of said outer cowl forming extension, and an arcuate guide rail slidably receiving said follower means, said guide rail extending generally transversely outwardly and forwardly from said windshield post and supported by said inner cowl member, said hinge assembly and guide means coacting with said closure structure to control the movement of said first closure structure from its closed position to an intermediate opened position laterally outwardly, forwardly, and slightly tilted forwardly with respect to said first body opening, said first closure structure then being angularly displaced with respect to said body opening and further tilted forwardly during further opening movement of said first closure structure from said intermediate opened position to its maximum opened position to displace said windshield forming portion, said side window, and said lower door structure relative to said body opening to provide access to said front row.

References Cited by the Examiner

UNITED STATES PATENTS

| | | | |
|---|---|---|---|
| 2,656,214 | 10/1953 | Alamagny | 296—28 |
| 2,822,214 | 2/1958 | Rivolta | 296—146 |
| 2,997,336 | 8/1961 | Huggins | 296—106 |
| 3,158,395 | 11/1964 | Smith | 296—146 |

BENJAMIN HERSH, *Primary Examiner.*

P. GOODMAN, *Assistant Examiner.*